United States Patent

[11] 3,602,428

| [72] | Inventors | Manfred Lochner<br>Worth;<br>Walter Leeder, Karlsruhe both of Germany |
|---|---|---|
| [21] | Appl. No. | 854,926 |
| [22] | Filed | Sept. 3, 1969 |
| [45] | Patented | Aug. 31, 1971 |
| [73] | Assignee | Siemens Aktiengesellschaft<br>Berlin and Munich, Germany |
| [32] | Priority | Sept. 13, 1968 |
| [33] | | Switzerland |
| [31] | | 13762/68 |

[54] HIGH-PRECISION PRESSURE REGULATOR
3 Claims, 1 Drawing Fig.

[52] U.S. Cl. .................................................... 236/93,
137/468, 137/505.47
[51] Int. Cl. ............................................... G05d 23/12,
23/12, F16h 17/38
[50] Field of Search ............................................ 137/468,
505.29, 505.46, 505.47; 236/92, 93

[56] References Cited
UNITED STATES PATENTS

| 334,714 | 1/1886 | Metzger .................. | 137/509.29 |
| 1,912,479 | 6/1933 | Holzaptel ................ | 137/505.46 |
| 2,274,145 | 2/1942 | Johnson .................. | 137/468 |
| 2,335,935 | 12/1943 | Hanley ................... | 137/505.29 X |
| 2,590,111 | 3/1952 | MacCracken ........... | 137/468 X |
| 2,638,920 | 5/1953 | Woodhull ................ | 137/468 X |
| 2,701,578 | 2/1955 | Hamilton ................ | 137/505.46 X |
| 2,774,374 | 12/1956 | Schneider ............... | 137/509.29 |

*Primary Examiner*—Harold W. Weakley
*Attorney*—Edwin E. Greigg

ABSTRACT: In a high-precision pressure regulator for maintaining the flow rate of a fluid at a strictly constant value, there is provided a fluid inlet and a fluid outlet, a bellows expandable by the pressure of said fluid, a spring acting on said bellows against the force of the fluid pressure and adjustable in accordance with the desired fluid pressure or flow rate, a push rod displaceable in response to said bellows and moving a baffle plate closer to or away from an inlet nozzle to control the pressure of the fluid emerging therefrom.

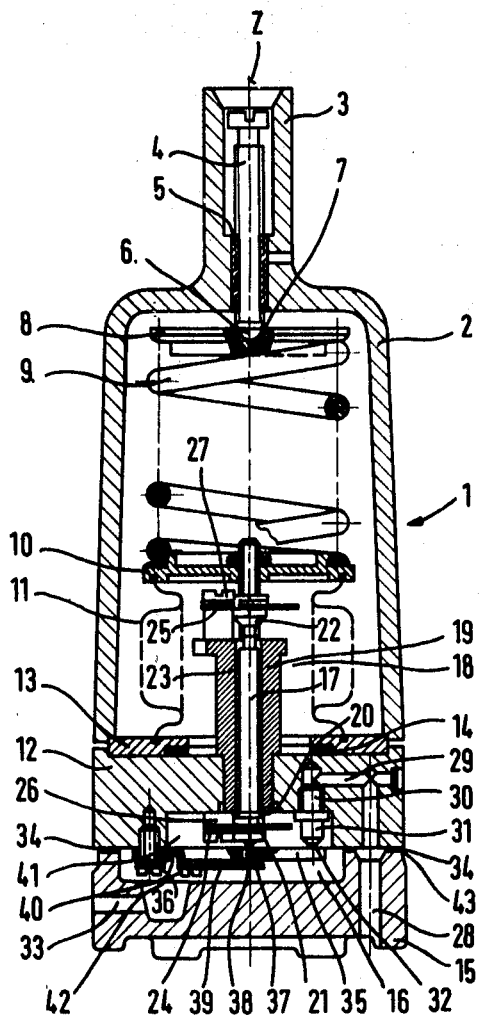

3,602,428

HIGH-PRECISION PRESSURE REGULATOR

BACKGROUND OF THE INVENTION

In gas chromatographic apparatuses the flow rate of gas streams (for example, carrier gases) often has to be maintained at a strictly constant value in the range between approximately 10 to 500 ml./min. Heretofore, such a result has been sought mostly by regulating the pressure by a constant fluid dynamic resistance. The difficulty with this type of pressure regulation resides in the fact that apparatuses used in gas chromatography have no provision for bleeding, that is, no intentional discharge takes place in the output conduit, since usually very expensive (e.g. helium) or highly combustible (e.g. hydrogen) gases are used. Accordingly, requirements regarding the fluidtightness of the valve seat of the pressure regulator valve are very strict.

Known high-precision pressure regulator valves comprise a valve stem, one end of which is secured to the inside of a closure plate of a spring-biased bellows and the other end of which extends through an opening to the other side of the second closure plate of the bellows. The terminus of the stem extending through said opening is enlarged into a valve head which has, for example, a spherelike configuration. The valve head closes the said opening in case the pressure in the inner pressure chamber of the bellows is greater than the desired pressure value set by means of an adjusting screw associated with said spring. The requirement for a high quality fluidtight seal of the valve seat is sought to be fulfilled in these known apparatuses by providing at least the work face of the valve head with an elastic coating such as rubber or plastic material, or making the entire valve head of such material. This type of structure has the disadvantage that the desired pressure value set by means of the adjusting screw may not be maintained constant over a longer period of time because of the creeping tendency and weak form-stability of nonmetallic materials in case of temperature variations.

OBJECT, SUMMARY AND ADVANTAGES OF THE INVENTION

It is an object of the invention to provide an improved high-precision pressure regulator in which the aforenoted disadvantages are eliminated.

Briefly state, according to the invention, there is provided a high-precision pressure regulator in which a desired pressure value, set by means of an adjusting screw, is transferable through a spring and bellows assembly to a push rod which is secured to that side of a first closure plate that is adjacent the spring and which extends through an opening through the second closure plate of the bellows. Adjoining said second closure plate there is arranged an output pressure chamber communicating with an output conduit and with the inner pressure chamber of the bellows and in which there is disposed a nozzle and baffle plate assembly. The gas flows through said nozzle into the outlet pressure chamber after impinging on the baffle plate which is movable by the aforenoted push rod for regulating the flow through said nozzle.

It is a significant advantage of the high-precision pressure regulator according to the invention that metal may be used for the sealing faces of the valve seat and valve head instead of nonmetallic materials required heretofore.

In order to obtain with high precision the exact value of the set pressure even in case of changes in temperature, there is provided a temperature compensator, comprising a bimetallic plate member secured to the baffle plate and in contact with the push rod to affect the position thereof as a function of temperature variations. Thus, due to the said temperature compensator, in case the temperature increases, the nozzle further opens and consequently, the pressure in the outlet pressure chamber increases. This compensates for any pressure decrease due to the slackening of the spring force caused by an increase in temperature.

The invention will be better understood, as well as further objects and advantages will become more apparent, from the detailed specification of a preferred, although exemplary, embodiment taken in conjunction with the sole FIGURE showing the embodiment in axial section.

DESCRIPTION OF THE PREFERRED EMBODIMENT

The high-precision pressure regulator generally indicated at 1 is disposed in a housing 2, the upper portion of which axially continues in a necklike extension 3. In the hollow extension 3 there is axially disposed a setting screw 4 in engagement with internal thread 5 of extension 3. The setting screw 4 extends into the housing 2 where its terminus 6 nests in a depression 7 of a spring seat disc 8. The latter is engaged by one end of a coil spring 9, the other end of which, in turn, engages the upper face of an upper or first closure plate 10 associated with the bellows 11. At its side remote from spring 9, the bellows 11 is secured to a lower or second closure plate 12 by means of a metallic ring 13 and a packing ring 14. The closure plate 12 adjoins the terminus of the housing 2 and its partially hollow inside forms, with the partially hollow inside of a further adjoining plate 15, an outlet pressure chamber 16. With closure plate 10 there is rigidly connected one end of a push rod 17 extending into the inner pressure chamber 18 of the bellows 11. The other end of the push rod 17 passes through a guide sleeve 19 and projects through an opening 20 into the outlet pressure chamber 16. The push rod 17 is movable by the closure plate 10 to any intermediate position between two conical abutments 21 and 22. The diameter of the push rod 17 inside the guide sleeve 19 (which is force-fitted into the closure plate 12) is so dimensioned that within guide sleeve 19 an annular space 23 is obtained which constitutes a gas conduit between the inner pressure chamber 18 and the outlet pressure chamber 16. For a precise guidance of the push rod 17 in the axial direction of the spring and bellows assembly, there are provided two leaf springs 24 and 25. One end of leaf spring 24 is secured to closure plate 12 by means of a fastening screw 26, while the mid portion of leaf spring 24 is affixed to the conical abutment 21. One end of leaf spring 25 is secured to the upper terminus of guide sleeve 19 by means of a fastening screw 27, while the mid portion of leaf spring 25 is affixed to the conical abutment 22. The push rod 17, the spring 9 and the setting screw 4 have a common axis Z.

Plates 15 and 12 are provided with a fluid inlet formed of bores 28, 29 and 30. The latter terminates in a nozzle 31 projecting into the outlet pressure chamber 16. The nozzle 31, having an axis that extends parallel to axis Z, has an opening 32 which is directed towards plate 15. From the outlet pressure chamber 16 there extends an outlet bore 33 through the plate 15 for the discharge of gas emitted by the nozzle 31. To a lower radial face 34 of the closure plate 12 there is attached a baffle plate 35 by means of a fastening screw 36. The baffle plate 35 is provided with an opening 37 through which a pin extension 38 of the push rod 17 passes. The upper face of baffle plate 35, at a location remote from fastening screw 36, cooperates with the opening 32 of the nozzle 31. The pin 38, the axis of which coincides with axis Z, freely extends through the opening 37 of the baffle plate 35 and engages a bimetallic plate member 39. The baffle plate 35 has a necklike portion 40 adjacent the edge of the cavity 41 of the closure plate 12 for effecting a resilient attachment of baffle plate 35 to closure plate 12. The bimetallic member 39 is, at one end, secured to the lower (outer) face of baffle plate 35 by means of a fastening screw 42. The two adjoining faces of the plates 15 and 12 are sealed by means of a gasket 43.

OPERATION OF THE PREFERRED EMBODIMENT

The high-precision pressure regulator 1 described hereinabove operates as a proportional regulator. By adjusting the preload of spring 9 with the setting screw 4, the desired value of the pressure is determined. The force exerted by the preloaded spring 9 is transmitted to the bellows 11 through the closure plate 10 with which the push rod 17 is rigidly connected. As the bellows 11 is being compressed by virtue of the force of spring 9, the shifting closure plate 10 moves the push rod 17 downwardly which, through bimetallic member 39 displaces the resiliently attached baffle plate 35 in a direction away from the opening 32 of the nozzle 31 through which gas flows into the outlet pressure chamber 16. The motion of baffle plate 35 away from opening 32 decreases the throttle effect plate 35 has on nozzle 31. Consequently, a larger quantity of gas is admitted through bores 28, 29 and 30 into the outlet pressure chamber 16 which also communicates with the outlet bore 33 and the inner pressure chamber 18 of the bellows 11. The pressure increase generated in bellows 11 by virtue of the increased gas quantities gives rise to an expansion force along Z opposing the force of spring 9. Said expansion force increases until an equilibrium of forces is established between the spring 9 and the bellows 11. This regulating step occurs in the same sequence in case the gas quantities taken out through bore 33 are increased. In such a case the greater pressure drop generated at the nozzle 31 is compensated by an opening of the baffle plate 35. If the setting screw 4 is adjusted so as to decrease the desired pressure values, that is, the spring 9 is slackened, or, if the gas quantities taken out at output 33 are decreased, the regulation occurs in a reverse sense, and thus the baffle plate 35 is moved closer to the nozzle 31 (increased throttling of nozzle 31.)

It is an advantage of the aforedescribed pressure regulator that the pressure adjusting component proper is a high precision nozzle and baffle plate assembly. The machined planar edge face of the opening 32 of nozzle 31 is sealed by the machined upper face of the baffle plate 35. The baffle plate 35 and the push rod 17 are held by means of leaf springs 24 and 25 in a frictionless manner and are positively guided so that no hystereses may appear. Excessive loads on the high-precision pressure regulator in either axial direction do not affect the desired pressure value once set by means of setting screw 4, since the conical abutments 21 and 22 which, in case of excess loads engage the terminal edge of the guide sleeve 19, prevent excessive excursions of the spring and bellows assembly.

A further advantage of the high-precision pressure regulator according to the invention is the structural arrangement of the nozzle and baffle plate assembly. The requirement for a high quality seal between the nozzle 31 and the baffle plate 35 may be obtained only if the planar-machined faces (the upper face of the baffle plate 35, the edge face 34 of the closure plate 12 and the peripheral face of the opening 32 of the nozzle 31) are in strict parallelism with respect to one another. This is achieved in the aforedescribed structure by machining the nozzle 31 together with the surface 34 when the former is already mounted in closure plate 12. The machined upper face of the baffle plate 35 is tightened to the edge face 34 in planar contact therewith. In this manner an optimal parallelism is obtained without time-consuming adjusting operations.

The temperature-compensating bimetallic member 39 ensures that the desired pressure is maintained with high precision even in case of changes in temperature. In case of increase in temperature, the bimetallic member 39 changes its configuration in such a manner that its distance from the lower face of baffle plate 35 decreases. Thus, an additional force is exerted upwardly on push rod 17 whereby a reaction force is generated which moves baffle plate 35 further away from nozzle 31. As a result, the pressure increases in the outlet pressure chamber 16. This pressure increase compensates for the pressure decrease which occurs as the temperature increases and renders the spring 31 weaker, thus tending to set a pressure which is lower than the desired value.

What is claimed is:

1. In a high-precision pressure regulator for controlling the flow rate of fluid passing therethrough, said regulator being of the type that includes (A) a fluid inlet and a fluid outlet, (B) a bellows having an inner pressure chamber communicating with said fluid and adapted to expand in response to the pressure exerted by said fluid, (C) a spring exerting a compressing force on said bellows in opposition to said pressure exerted by said fluid, and (D) means for arbitrarily adjusting the preload of said spring thus varying the force exerted thereby, the improvement comprising, A. an outlet pressure chamber adapted to communicate with said fluid inlet, said fluid outlet and said internal pressure chamber, B. a nozzle attached to said fluid inlet and disposed in said outlet pressure chamber, C. a baffle plate having a face cooperating with said nozzle D. means for rigidly affixing one end of said baffle plate within said outlet pressure chamber to a location remote from said nozzle, E. bias means for urging said baffle plate against said nozzle; said bias means rendering said baffle plate resilient with respect to its end affixed in said outlet pressure chamber, F. a push rod fixedly secured to said bellows to be displaced therewith when said bellows expands or contracts in response to the opposed forces exerted by said spring and by said fluid in said inner pressure chamber, and G. means providing an engagement between said push rod and said baffle plate to cause displacement of the latter with respect to said nozzle in response to the motion of said bellows.

2. An improvement as defined in claim 1, including

A. an aperture provided in said baffle plate,

B. a bimetallic member extending over said aperture at a distance therefrom and secured at one end to said baffle plate against a face thereof opposed from the face cooperating with said nozzle; said push rod passes through said aperture and engages said bimetallic member; in case of temperature increase in said outlet pressure chamber said distance between said aperture and said bimetallic member is decreased, whereby said baffle plate is moved away from said nozzle permitting an increase of the fluid flow therethrough.

3. An improvement as defined in claim 1, wherein said nozzle includes a terminal edge face extending substantially parallel with said face of said baffle plate; said terminal edge face of said nozzle and at least that portion of said face of said baffle plate that cooperates with said nozzle have a machined planar surface; when said baffle plate is in contact with said nozzle, a plane containing said terminal edge face coincides with the last-named portion of said baffle plate face.